J. SIEVEN.
DEMOUNTABLE RIM.
APPLICATION FILED DEC. 15, 1919.

1,365,555.

Patented Jan. 11, 1921.

WITNESSES
H. T. Walker
J. C. Ledbetter

INVENTOR
JACOB SIEVEN.
BY
Munn & Co
ATTORNEYS

UNITED STATES PATENT OFFICE.

JACOB SIEVEN, OF BROOKLYN, NEW YORK.

DEMOUNTABLE RIM.

1,365,555.   Specification of Letters Patent.   Patented Jan. 11, 1921.

Application filed December 15, 1919. Serial No. 345,006.

*To all whom it may concern:*

Be it known that I, JACOB SIEVEN, a citizen of the United States, and a resident of the city of New York, borough of Brooklyn, in the county of Kings and State of New York, have invented a new and Improved Demountable Rim, of which the following is a full, clear, and exact description.

This invention relates to rims for vehicles such as motor cars, and more particularly to demountable rims. The invention more specifically has relation to separable or knockdown rims of the demountable class for pneumatic tires used on motor car wheels.

Modern automobiles are usually fitted with demountable rims in order to facilitate the changing of tires where the motor car carries a separate tire for emergency use in case one of the service tires fails. There are various classes of automobile rims in present day service, and since the rims are subjected to unusually heavy usage, there is rapid depreciation and the rim becomes worn to the extent that it does not always function to admit of ease in tire changes.

It is fitting, therefore, that the object of my invention is to improve and simplify the demountable rim to render more convenient the changing of tires.

An object of my invention is to provide a demountable rim built in separable sections having positive locking means for holding the sections together, and having such an arrangement of locking means as will enable the rapid removal or fitting up of a repaired tire or a new tire on the rim.

With the above principal objects and others in view, this invention has relation to the combination and arrangement of a minimum number of parts, several variations in design and construction of which are set forth in the accompanying claims, and one practical embodiment of which is described in the following specification, and illustrated in the accompanying drawings, wherein:

Figure 1:
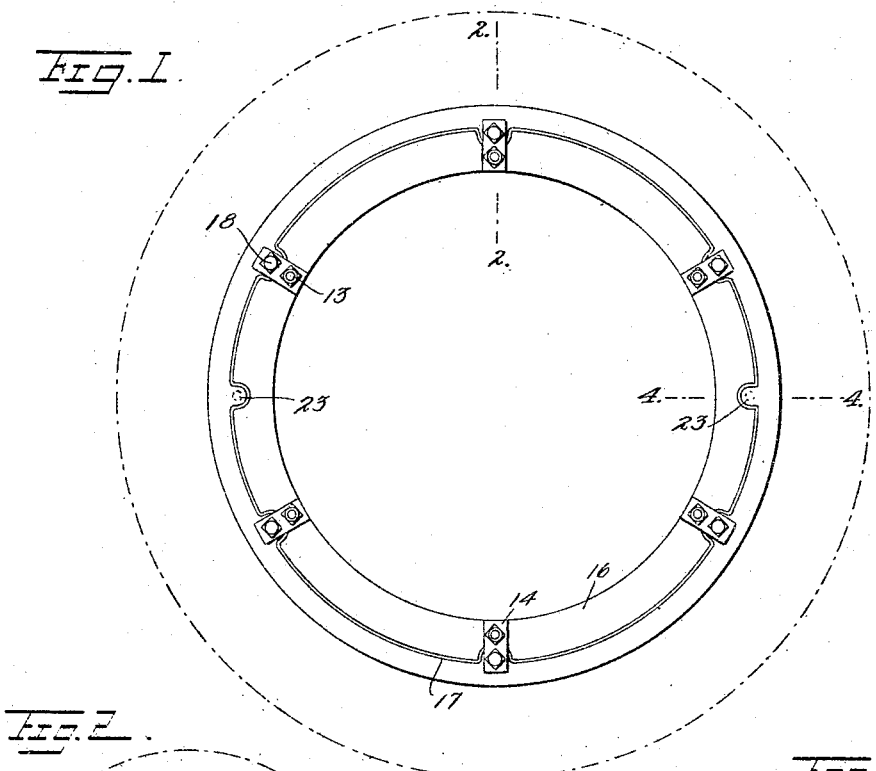
Figure 1 shows a side elevation of this demountable rim mounted on the felly of a vehicle wheel, and the pneumatic tire is shown in dotted lines applied to the rim.

The principles of design and construction employed in the present invention may be applied to any type of demountable rim where it is desired to make the demountable rim in two radially-separable parts to facilitate the changing of tires after the demountable rim has been removed from the wheel of a motor car. A rim constructed in accordance with the plans of my invention involves the use of a rim split or cut radially to provide two separable sections. The rim sections fit together on a plane at an angle to the radial plane of the rims, or the rim is cut on a plane slightly transverse to the center line of the rim. Centering means are provided for quickly locating the proper position of the two rim parts, and positive locking means are provided for firmly clamping the two rim sections together after assembly is completed.

In presenting a more detailed explanation of my invention, together with its advantages in use, there is pointed out in the drawings a rim embodying two separable sections 8 and 9. The rim sections 8 and 9 are formed by splitting the plain rim to form the two parts with the contacting edges of the two parts arranged to fit flush one with the other and leave a smooth inner and outer rim surface. Each rim section is provided on the outer edge thereof with either one of the well-known tire bead holding rings; that is to say, the rim sections 8 and 9 have either the clencher-type ring or the straight-side tire-holding ring. It is seen, therefore, that any conventional type of pneumatic tire may be applied to this rim.

Figure 5:
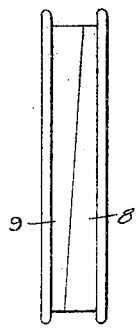
Fig. 5 illustrates a front or edge view of the separable rim joined together and ready to receive the tire.

Reference is made to the particular design in shape and function of the abutting edges of the rim sections 8 and 9, wherein the abutting or contacting rim sections 8 and 9 are formed on an angle; that is to say, the contacting edges of the rim sections join on a line transverse to a medial-center line drawn radially about the rim. This provides two rim sections where each section has a broad rim face tapering down to a narrow rim face, and in putting the rim together the narrow and broad faces of the rim parts are joined together as illustrated in Fig. 5.

The rim is provided with ribs or projections 12 integrally made with the rim or constructed separately and welded thereto. The ribs 12 are equidistantly spaced about the inner face of the rim and provide holding means to securely mount it upon the vehicle wheel. A hole is drilled through the rib 12 for the reception of a bolt or cap screw 13 which is inserted through one of the rib sections and is threaded into the other. A locking plate 14 is confined on the cap screw 13 under the head thereof, and it is desirable to insert a lock washer between the cap-screw head and the locking plate to prevent possible loosening of the cap screw. The locking plate is used, as later seen, to lock the rim on the felly of the motor-car wheel. The cap screw acts to clamp the two rim sections together, and it is practical to employ several ribs 12 and cap screws 13 at comparatively closely spaced intervals around the periphery of the rim, dependent upon the size and weight of the motor car upon which the rim is mounted.

The vehicle wheel felly 16 is shown in the drawings in order to facilitate the comprehension of the relation between the rim and the felly. The felly 16 is provided with grooves which are the counterpart of the ribs 12. The felly 16 is further provided with the usual binder band 17 necessarily employed to clamp the felly sections together when the wheel is constructed. The binder band is, therefore, pressed into the grooves, as shown in Fig. 1, to form a steel-faced receptacle in which the rib 12 of the rim is firmly seated. The edge of the binder band 17 opposite from the locking plate 14 is provided with the usual flange 19, which prevents the rim from slipping off of the felly on that side, while the locking means restrains the rim from movement in the other direction. Thus, the rim is securely anchored on the felly between the flange 19 and the several locking plates. A bolt 18 is passed through a hole formed in the felly and receives the locking plate 14. The locking plate, therefore, is clamped under the heads of the adjacent bolt 18 and cap screw 13, and in this manner the sectional and demountable rim is securely anchored to the wheel.

Figure 4:
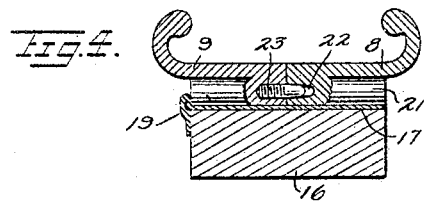
Fig. 4 illustrates a cross-sectional view taken on the plane of section 4—4 of Fig. 1 to illustrate a dowel-pin centering means employed in the rim construction.

There is provided centering means on each rim section 8 and 9 to bring the two rim sections into proper registry one with the other in order that the cap screws 13 may be readily inserted through the abutting rib sections 12 when the rim is assembled. This centering means consists of a pair of diametrically-disposed ribs 21, and the rib 21 necessarily comprises two sections similar to the clamping ribs 12. One of the rib sections 21 is provided with a dowel socket 22, while the other rib is fitted with a dowel 22, which is permanently fixed in the rib and adapted to tightly slip into position in the socket 22 when the two rim sections are brought together. The Fig. 4 discloses a detail structure of the rim centering means, while the Fig. 1 portrays the opposite relation of these two dowel pins 23. Obviously, there may be employed any suitable number of centering means, but it is practical in rim construction to use two of the dowel pins diametrically opposite, as presented in this disclosure.

In assembling the rim with a tire, the tire is applied to one of the sections, then the other rim section is inserted in the tire and rotated until the dowel pins 23 drop into the sockets 22. The two rim sections 8 and 9 are then correctly related one with the other so that the cap screws 13 may be readily screwed into set position to hold the two rim sections together.

Figure 2:
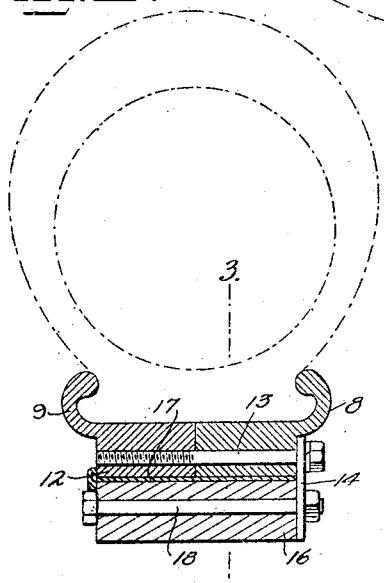
Fig. 2 illustrates a cross-sectional view taken on the line 2—2 of Fig. 1.
Figure 3:
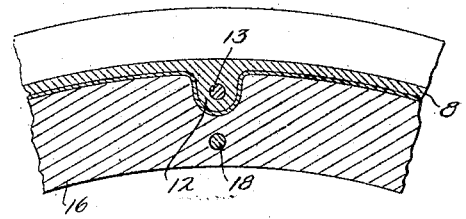
Fig. 3 illustrates a cross-sectional view taken on the line 3—3 of Fig. 2.

When the rim parts are applied with a tire between the parts, it is usually quite difficult to force the tire down into position because of the resistance offered by the heavy casing of the tire. By making the rim sections 8 and 9 beveled in relation one to the other as shown in Fig. 5, it is found easier to compress the casing until the adjacent edges of the sections are brought together. The rim sections 8 and 9 may be applied quarteringly in relation one to the other and one of the sections subjected to rotation until the dowel pins 23 register with the sockets 22. The two rim sections execute a clamping action on the stiff and resisting tire casing due to the clamping action of the angular rim faces when one rim section is rotated relatively to the other; and this action facilitates the forcing of the tire casing into position, as shown in Fig. 2.

The use of this type of separable demountable motor-vehicle rim will greatly augment the tire changes so prevalent in motor-car use, and is comparatively inexpensive in construction, is staunch and rigid in its makeup, and not likely to get out of working order.

Having thus described my invention what I desire to secure by Letters Patent is:

1. As a new article of manufacture, a rim including a pair of annular sections, said sections being cut on a plane at an angle to the radial plane of the rim to provide opposing cam surfaces on the confronting faces of the rim sections, whereby upon relative rotation of said rim sections axial separation of the sections will be effected.

2. As a new article of manufacture, a rim including a pair of annular sections, said sections being cut on a plane at an angle to the radial plane of the rim to provide opposing cam surfaces on the confronting faces of the rim sections, whereby upon relative rotation of said rim sections axial separation of the sections will be effected, and means formed respectively on each rim section, adapted to register and co-act for locking the same against relative separation when said rim sections are positioned to obtain the narrowest axial adjustment.

3. As a new article of manufacture, a rim, comprising a pair of annular sections, the meeting edges of said sections forming an ellipse, the plane of said ellipse being located at an angle to the radial plane of the rim.

4. As a new article of manufacture, a rim, comprising a pair of annular sections, the outer edges of said sections being circular and the inner edges of said sections being elliptical.

JACOB SIEVEN.